(12) United States Patent
Roux et al.

(10) Patent No.: US 8,224,504 B2
(45) Date of Patent: Jul. 17, 2012

(54) METHOD AND DEVICE FOR UPDATING THE POSITION OF AN AIRCRAFT

(75) Inventors: Yohann Roux, Cugnzux (FR); Alexandre Pericart, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 0 days.

(21) Appl. No.: 13/075,441

(22) Filed: Mar. 30, 2011

(65) Prior Publication Data

US 2011/0251791 A1    Oct. 13, 2011

(30) Foreign Application Priority Data

Apr. 9, 2010 (FR) .................................... 10 52686

(51) Int. Cl.
*G01C 23/00* (2006.01)

(52) U.S. Cl. .................. 701/3; 701/8; 701/14; 701/408; 701/500; 342/357.2; 342/357.23; 340/945

(58) Field of Classification Search .................. 701/19, 701/20, 117, 3, 8, 14, 38, 408, 412, 505, 701/500; 180/65.21; 342/357.2, 357.23; 340/945

See application file for complete search history.

(56) References Cited

U.S. PATENT DOCUMENTS

| | | | | |
|---|---|---|---|---|
| 4,480,226 A * | 10/1984 | Kuno et al. | ..................... | 324/247 |
| 5,239,472 A * | 8/1993 | Long et al. | ....................... | 701/20 |
| 5,273,486 A * | 12/1993 | Emmons et al. | ................. | 454/74 |
| 5,923,286 A | 7/1999 | Divakaruni | | |
| 6,668,217 B1 * | 12/2003 | Franke et al. | .................... | 701/19 |
| 6,707,424 B1 | 3/2004 | Snyder et al. | | |
| 7,127,336 B2 * | 10/2006 | Houpt et al. | ..................... | 701/19 |
| 7,590,485 B2 * | 9/2009 | Daum et al. | ................... | 701/123 |
| 2003/0236598 A1 * | 12/2003 | Villarreal Antelo et al. | ... | 701/19 |
| 2005/0035898 A1 * | 2/2005 | Shiomi et al. | .................... | 342/36 |
| 2008/0077285 A1 * | 3/2008 | Kumar et al. | .................... | 701/19 |
| 2008/0119970 A1 | 5/2008 | Campbell et al. | | |
| 2008/0125924 A1 * | 5/2008 | Daum et al. | ..................... | 701/19 |
| 2009/0192709 A1 | 7/2009 | Yonker et al. | | |

FOREIGN PATENT DOCUMENTS

FR                2922641            4/2009

OTHER PUBLICATIONS

Anonymous, FMS Technical Newsletter, Winter/Spring 1992, XP-002610809, Internet, /www.honeywellaes.com.
French Patent Office, International Search Report FR 1052686 (2 pgs.), Nov. 23, 2010.

* cited by examiner

*Primary Examiner* — Redhwan k Mawari
(74) *Attorney, Agent, or Firm* — Wood Herron & Evans LLP

(57) ABSTRACT

A method and device for updating the position of an aircraft includes a flight management system incorporating first and second position supplying devices for supplying first and second positions during flight. The first position is based on inertial data and based on data from a satellite positioning system. The second position is based on inertial data and based on data from a radio-navigation system. The flight management system also includes an updating system that includes a fly over updating device, a radar updating device, and a take off updating device. The updating system is operable to generate an updating position manually or automatically that will be used as the second position and selected as a new position for use with the flight management system.

8 Claims, 1 Drawing Sheet

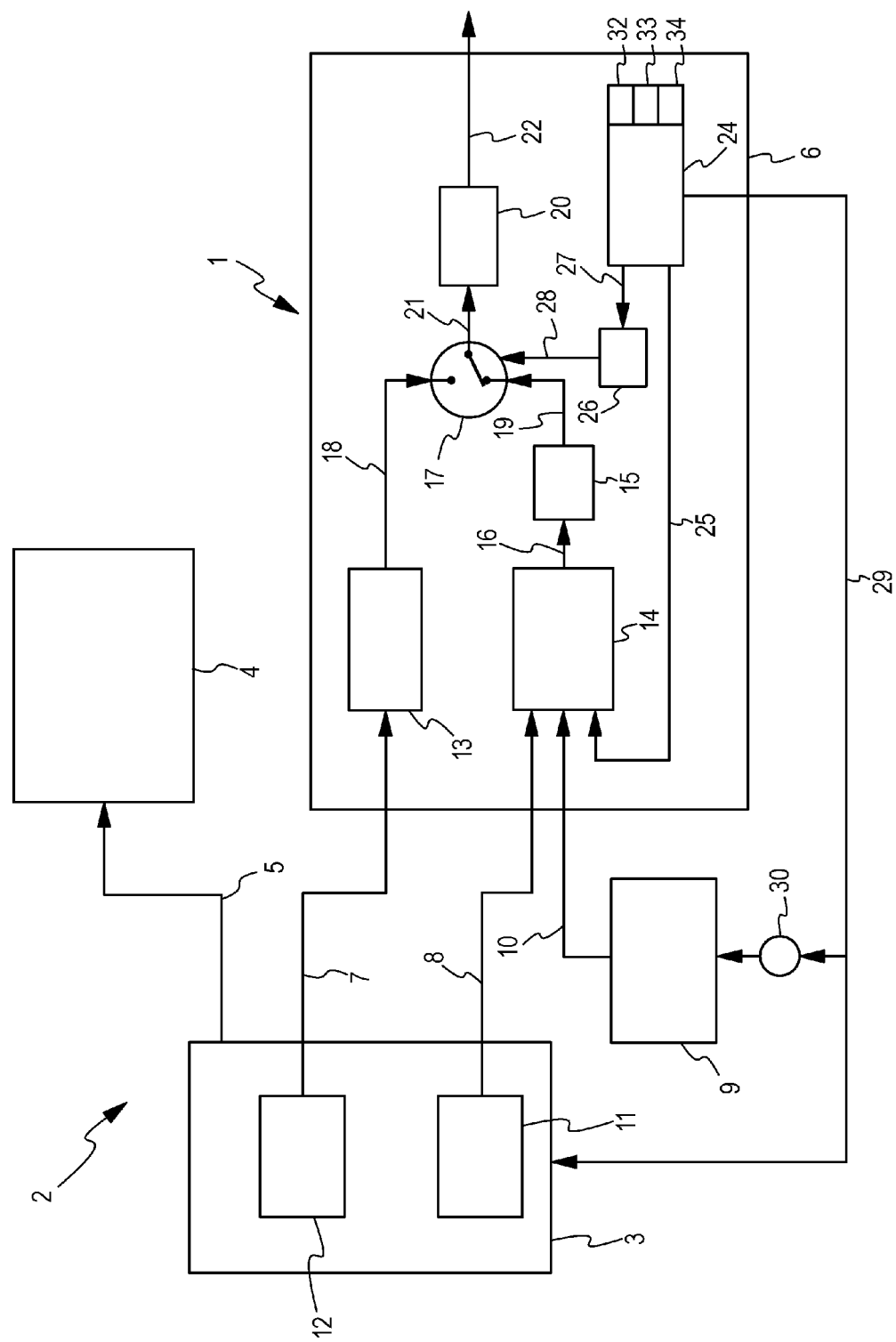

METHOD AND DEVICE FOR UPDATING THE POSITION OF AN AIRCRAFT

TECHNICAL FIELD

The present invention relates to a method and a device for updating the position of an aircraft, in particular a transport airplane, during the flight of the airplane.

BACKGROUND

From document FR-0,707,406, an updating device is known comprising means for calculating an updating bias and for adding such an updating bias to any new position of the aircraft. Such an updating bias illustrating a position error of the aircraft could be determined:
either by the aircraft flying over a spot on the Earth, with the bias corresponding to the deviation between the position of the spot being flown over (stored in a database) and the current position of the aircraft while flying over;
or by means of a radar, the bias corresponding to the deviation on a radar display between the position of a particular spot seen by the radar and the position of such a spot in a data base.

It is known that determining, updating and taking into account the position of an aircraft occur at the level of a set of systems in the aircraft, generally comprising a GADIRS (<<GPS Air data Inertial Reference System>>) type inertial and anemometric reference system and, connected to the latter, more specifically a FCGS (<<Flight Control Guidance System>>) type flight calculation system and a FMS ("Flight Management System") type flight management system. Furthermore, in such a usual architecture, the flight management system generally comprises:
a means for supplying a first consolidated GPIRS position of the aircraft, being determined from inertial data and data supplied by a satellite positioning system, including the GPS ("Global Positioning System") type;
an inertial and radio-navigation calculation means for supplying a second IR/Navaids position of the aircraft, being determined from inertial data and data supplied by radio-navigation means (VOR, DME, TACAN); and
selection means for selecting one of said first and second positions, that will be taken into account as a position updated by said flight management system.
Generally, in such a usual architecture:
the GPIRS position is updated at the level of the GADIRS system and the IR/Navaids position is updated at the level of the FMS system, which makes necessary implementing a complex interface (comprising a dating of data) between GADIRS and FMS systems, for exchanging updated positions;
updating the position occurs via means for correcting the bias at the level of GADIRS and FMS systems;
the FCGS system comprises means for subtracting the biases from the updated GPIRS positions received from the GADIRS system, so as to avoid a position used by said FCGS system (that should be quite accurate) from being impacted by a bias taken into account by said GADIRS system; and
only manual updates are provided (through flying over or using a radar) being triggered and managed by a crew member.

Such a usual architecture that seems complex and expensive is not fully satisfactory.

SUMMARY

The present invention aims at overcoming such drawbacks. It relates to a simplified method for updating, during a flight, the position of an aircraft, in particular a military transport airplane.

To this end, according to this invention, said method wherein at the level of a flight management system:
the following operations are performed:
a first position of the aircraft is determined from inertial data and from data supplied by a satellite positioning system;
through at least one inertial calculation and radio-navigation means, a second position of the aircraft is determined, from inertial data and from data supplied by radio-navigation means; and
one of said first and second positions is selected, that will be taken into account as a position updated by said flight management system; and
an updating system is provided being able to generate an updating position, is remarkable in that:
there are integrated into said updating system simultaneously means for manually updating through flying over, means for manually updating through radar, and means for automatically updating at takeoff; and
during an update implemented by said updating system:
an updating position generated by said updating system during such an updating is supplied to said inertial calculation and radio-navigation means, for determining said second position, and
as an updated position, the second position is selected thus determined by said inertial calculation and radio-navigation means using said updating position.

Thus, thanks to this invention, updating occurs only at the level of the flight management system, allowing to simplify the position updating architecture and to facilitate its integration into the aircraft. To this end, in particular:
the complex interface (comprising a dating of data) existing between the GADIRS and FMS systems could be suppressed in the above mentioned usual architecture, and a simple interface could be provided, as the present invention does not provide any transfer of updated positions from the GADIRS system to the FMS system, the updating occurring in said FMS flight management system;
as the updated position is generated by the inertial calculation and radio-navigation means by means of the updating position, and not from the correction of a bias (obtained from an updating position), the usual means for correcting the bias could be suppressed at the level of GADIRS and FMS systems, as well usual means for subtracting the bias at the level of the FCGS system; and
updating is only implemented at the level of the flight management system.

Furthermore, the present invention also has the following advantages:
an extended implementation is obtained, as this invention allows not only for manual updating (through flying over or through radar), but also for an automatic updating (during the takeoff);
as updating occurs via an inertial calculation and radio-navigation means, and not via a bias calculation, a faster convergence is obtained on the position after a position updating and returning to a usual calculation performed by said inertial calculation and radio-navigation means; and the present invention has no impact on the systems of the aircraft using the GPIRS positions of the GADIRS system.

Furthermore, the present invention could be implemented on any type of aircraft and, in particular, on a civil or military transport airplane.

Advantageously, upon an aircraft take off, if the data supplied by the satellite positioning system are not available, an update of the position of the aircraft is automatically performed using said automatic updating means, and, as soon as the data supplied by the satellite positioning system are available again:

a first position of the aircraft is again determined from said data supplied by the satellite positioning system; and one of said first and second positions is automatically selected again, that will be taken into account as a position updated by said flight management system.

Furthermore, in this case, advantageously, said second position is determined, on the one hand, from inertial data, and, on the other hand:

from data supplied by the radio-navigation means, if such data are available; and otherwise, from the updating position.

Furthermore, advantageously, during a manual update performed by a crew member of the aircraft via manual updating means (through flying over or through radar), in addition to the calculation of the second position by means of the updating position and the selection of such a second position as the updated position, there is an automatic cancellation of the selection of the sensors other than inertial sensors, supplying data for determining a position of the aircraft. This represents an operational assistance for limiting the work load of a crew.

Moreover, in such a case, advantageously, for stopping the manual update, at least one sensor is manually selected, having its selection previously cancelled, and the data supplied by such a sensor are used for determining a position of the aircraft.

The present invention further relates to a device for updating the position of an aircraft, in particular a transport airplane, during the flight of the latter.

According to this invention, said updating device of the type comprising a flight management system, comprising:

a first means for supplying a first position of the aircraft being determined from inertial data and from data supplied by a satellite positioning system;

a second means corresponding to an inertial calculation and radio-navigation means, for supplying a second position of the aircraft being determined from inertial data and from data supplied by radio-navigation means;

selection means for selecting one of said first and second positions, that will be taken into account as a position updated by said flight management system; and an updating system being able to generate an updating position, is remarkable in that said updating system simultaneously integrates means for manually updating through flying over, means for manually updating through radar, and means for automatically updating at take off, in that the outlet of said updating system is connected to the inlet of said inertial calculation and radio-navigation means so that the latter uses, during an update implemented by said updating system, an updating position generated by said updating system for determining said second position as an updated position, and in that said flight management system further comprises controlling means compelling the selection means to select, during an update implemented by said updating system, the second position determined by said inertial calculation and radio-navigation means using said updating position.

Thus, thanks to this invention, an updating device is obtained having a particularly simple architecture. Such an updating device could be easily achieved and easily integrated into the aircraft, as it is only involved at the level of the flight management system (and no longer at the level of three GADIRS, FMS and FCGS systems as in a usual architecture).

Such a new architecture of an updating device is particularly well adapted for a military transport airplane, requiring particularly accurate position information.

In a particular embodiment, said automatic updating means are formed so as to automatically update the position of the aircraft, if the data supplied by a satellite positioning system are not available while said aircraft is taking off, and said device further comprises auxiliary means for selecting, again, automatically, one of said first and second positions, that will be taken into account as a position updated by said flight management system, as soon as the data supplied by the satellite positioning system is again available.

Furthermore, in another embodiment, said device further comprises means for automatically cancelling the selection of sensors other than inertial sensors, supplying data for determining a position of the aircraft, during a manual update performed by a crew member of the aircraft by means of said manual updating means.

The present invention further relates to a set of aircraft systems, more specifically comprising:

an inertial and anemometric reference system;

a flight calculation system; and a flight management system, corresponding to the above mentioned device according to this invention.

Moreover, the present invention further relates an aircraft, more particularly a transport airplane, comprising such a device or such a set of systems.

BRIEF DESCRIPTION OF THE DRAWING

The single FIGURE of the appended drawing will better explain how this invention could be performed. Such a single FIGURE is a block diagram of an updating device according to this invention.

DETAILED DESCRIPTION

The device 1 according to this invention and schematically shown on the FIGURE is to be used for updating the position of an aircraft, more particularly of a not shown military transport airplane, during a flight of the aircraft.

Such a device 1 being on board the aircraft can be part of a set 2 of systems of the aircraft, such as shown on the FIGURE Such a set 2 more specifically comprises:

a usual inertial and anemometric reference system 3 of the GADIRS (<<GPS Air Data Inertial Reference System>>) type. In a preferred embodiment, this system 3 comprises a plurality, preferably three, of inertial and anemometric reference units of the GADIRU (<<GPS Air Data Inertial Reference Unit>>) type not separately shown;

a usual flight calculation system 4 of the FCGS (<<Flight Control Guidance System>>) type being connected via a link 5 to said system 3. In a preferred embodiment, this system 4 comprises a plurality, preferably two, of flight calculators of the FCGC (<<Flight Control Guidance Computer>>) type not separately shown;

a flight management system 6 of the FMS ("Flight Management System") type being connected via links 7 and

8 to said system 3. In a preferred embodiment, this system 6 comprises a plurality, preferably two, of flight management computers of the FMC ("Flight Management Computer") type not separately shown; and a radio-navigation system 9 being connected via a link 10 to the system 6 and comprising at least one, but preferably a plurality of usual radio-navigation devices for example of the VOR (<<VHF Omnidirectional Range>>) type or DME (<<Distance Measuring Equipment>>) type or TACAN (<<Tactical Aerial Navigation>>) type generating and supplying in a usual way radio-navigation data.

Moreover, said inertial and anemometric reference system 3 more specifically comprises:

a usual inertial data generating device 11 for generating and supplying in a usual way inertial data of the aircraft; and a usual hybrid position generating device 12 for generating and supplying in a usual way a hybrid position of the aircraft, from inertial data received from the inertial data generating device 11 and from data supplied by at least one (not shown) sensor being associated with a satellite positioning system, including of the GPS ("Global Positioning System") type.

Furthermore, said flight management system 6 comprises:

a GPIRS position generating device 13 for supplying a GPIRS position of the aircraft. Such a GPIRS position is a consolidated position being determined from hybrid positions received from the hybrid position generating device 12, respectively from the different inertial and anemometric reference units of the system 3. Such hybrid positions are thus determined from inertial data and from data supplied by a satellite positioning system;

an inertial and radio-navigation position calculation device 14 for determining at least one IR/Navaids position of the aircraft, from inertial data received from the inertial data generating device 11 via the link 8, and from radio-navigation data received from the radio-navigation system 9 via the link 10. Generally, the inertial and radio-navigation position calculation device 14 determines three IR/Navaids positions issued from three Kalman filters, combining each one of the three inertial data. A usual signal selection device 15 is connected to the outlet of the inertial and radio-navigation position calculation device 14 via a link 16; and a selector 17 for selecting one of the GPIRS and IR/Navaids positions respectively received via links 18 and 19. The selector 17 usually selects the most accurate position, in particular through quality information being associated with the position data being used. The thus selected position is submitted to a smoothing treatment using a usual smoothing treatment device 20 (being connected to the selector 17 via a link 21). It is then taken into account as a position updated by the flight management system 6, being directly used by the system 6 and/or being transmitted via a link 22 to a user device (not shown).

According to this invention, the updating device 1 comprises said flight management system 6 further comprising an updating system 24. Moreover, according to the invention:

this updating system 24 simultaneously integrates a manually-operated fly over updating device 32 for updating through flying over, a manually-operated radar updating device 33 for updating through radar, and an automatically-operated take off updating device 34 for updating at take off;

the outlet of the updating system 24 is connected, via a link 25, to the inlet of the inertial and radio-navigation position calculation device 14 so that the latter uses, during an update implemented by the updating system 24, the updating position generated by the updating system 24 for determining a position of the aircraft; and the flight management system 6 further comprises a controller 26 (connected to the system 24 via a link 27) compelling (via a link 28) the selector 17 to select, during an update implemented by the updating system 24, the position determined by the inertial and radio-navigation position calculating device 14 using the corresponding updating position.

Thus, thanks to this invention, updating occurs only within at the level of the flight management system 6, allowing to simplify the position updating architecture and to facilitate its integration into the aircraft. More particularly:

the complex interface (comprising a dating of data) existing between the systems 3 and 6 can be suppressed in a usual architecture, and a simple interface could be provided (illustrated by the links 7 and 8), as the present invention does not provide any more transfer of updated positions from the system 3 to the system 6, updating occurring in said flight management system 6; and as the updated position is generated by the inertial and radio-navigation position calculating device 14 by means of an updating position, and is therefore not generated from the correction of a bias (obtained from an updating position), the usual methods for correcting the bias existing at the level of the GADIRS and flight management systems 3 and 6 could be suppressed in a usual architecture, as well as usual devices for subtracting the bias existing at the level of the flight calculation system 4 in the usual architecture.

Moreover, the updating device 1 according to the present invention has further the following advantages:

an extended implementation, as said updating device 1 allows not only for manual updating (through flying over or through radar), but also for an automatic updating (during the takeoff);

updating occurs via the inertial calculation and radio-navigation position calculating device 14 (and not via a bias calculation), a faster convergence is obtained on the position after a position update because such an updated position is normally more accurate and the return to a usual calculation is performed by the inertial and radio-navigation position calculating device 14; and no impact on the usual systems (CDS, HUD, ISIS, . . . ) of the aircraft using the GPIRS positions directly from the system in "back-up" mode.

In a particular embodiment to be used upon takeoff of the aircraft:

the device 1 comprises sensors (not shown) for detecting whether the data supplied by the satellite positioning system are available or not, such data being used for determining a GPIRS position. Such sensors could further be reception sensors receiving a piece of information about the availability of appropriate usual signals; and devices for automatically updating the updating system 24 are formed so as to perform a usual automatic update of the position of the aircraft (at the time when the aircraft reaches the threshold of the takeoff runway, the position of which is known), if the data supplied by the satellite positioning system are not available (breakdown, masking, interference, etc.) upon said takeoff.

The device 1 further comprises auxiliary device (being, for example integrated into the selector 17) for again automatically selecting a first position or a second position (determined respectively by the GPIRS position supplying device 13 and the inertial and radio-navigation position calculation device 14), that will be taken into account as the position updated by the flight management system 6, as soon as the data supplied by the satellite positioning system are again available. To this end, it is only necessary that data supplied by a single sensor (associated with said satellite positioning system) are again available.

The second position is determined by the inertial and radio-navigation position calculation device 14, on the one hand, from inertial data received from the inertia data generating device 11, and on the other hand:
from data supplied by the radio-navigation system 9, if such data are available; and
otherwise, from the updating position (received from the updating system 24).

Moreover, in another embodiment relating to a manual update performed by a crew member of the aircraft using a manually-operated manual updating device 32, 33 (through flying over or through radar), the device 1 further comprises a device for automatically cancelling (via a link 29) the selection of sensors (being, for example, part of GADIRS 3 and the radio-navigation system 9) other than inertial sensors, i.e. essentially GPS sensors and radio-navigation sensors, supplying data for determining a position of the aircraft. The link 29 could be connected to a selection device 30 selecting the available radio-navigation data.

In order to stop such a manual update, a crew member selects, again manually, in a usual way, at least one sensor, the selection of which has been preliminarily cancelled, and the device 1 then uses the data supplied by such a sensor for determining a position of the aircraft.

When a crew member has re-selected at least one sensor, the device 1 automatically calculates a position based on one of such selected sensors, as long as data regarding such a sensor are available. Otherwise, the updated position is maintained, but in an updated state. This is similar to automatic updating upon takeoff.

Furthermore, a crew member could suppress the last updated position, either by controlling a new update, or by selecting (more specifically via the system 6) a sensor being available for supplying data.

Consequently, thanks to this invention, an updating device 1 is obtained, having a particularly simple architecture. Such an updating device 1 could be achieved easily and readily integrated into the aircraft, as it is only involved at the level of the flight management system 6 (and no longer at the level of three systems 3, 4, and 6 as would be the case in a usual architecture). Such a new, accurate and simplified architecture of an updating device 1 is particularly well adapted for a military transport airplane.

The invention claimed is:

1. A method for updating the position of an aircraft during a flight, the method comprising:
performing a series of operations with a flight management system, the operations including:
determining a first position of the aircraft from inertial data and from data supplied by a satellite positioning system;
determining a second position of the aircraft from inertial data and from data supplied by a radio-navigation system using an inertial and radio navigation position calculating device; and
selecting a most accurate value of the first and second positions, that will be used as a new position by the flight management system; and
generating an updating position with an updating system that includes a manually-operated fly over updating device for updating through flying over, a manually-operated radar updating device for updating through radar, and an automatically-operated take off updating device for updating upon takeoff,
wherein during an update implemented by the updating system:
the updating position generated by the updating system during such an update is supplied to the inertial and radio-navigation position calculating device, for determining the second position, and
the second position, thus determined by the inertial and radio-navigation position calculating device using the updating position, is selected as a new position that will be used by the flight management system,
wherein during a manual update performed by a crew member of the aircraft using the fly over updating device or the radar updating device manual update means, the method further comprises:
cancelling automatically a selection of sensors, other than inertial sensors, that supply data for determining a position of the aircraft.

2. The method according to claim 1, further comprising:
during an aircraft takeoff, if the data supplied by the satellite positioning system are not available, updating the position of the aircraft automatically, using the take off updating device, and
as soon as the data supplied by the satellite positioning system are again available, determining a first position of the aircraft again, from the data supplied by the satellite positioning system, and one of the first and second positions is again selected by the selector, that will be used as a new position by the flight management system.

3. The method according to claim 2, wherein the second position is determined from inertial data, and from one of:
data supplied by radio-navigation system if such data are available; and
otherwise, the updating position.

4. The method according to claim 1,
wherein the manual update is stopped by selecting at least one sensor, having a selection that was previously cancelled, and in that the data supplied by such a sensor are used for determining a position of the aircraft.

5. A device for updating the position of an aircraft upon a flight, said device comprising:
a flight management system, including:
a first position supplying device for supplying a first position of the aircraft, the first position being determined from inertial data and from data supplied by a satellite positioning system;
a second position supplying device having an inertial and radio-navigation position calculating device for supplying a second position of the aircraft, the second position being determined from inertial data and from data supplied by a radio-navigation system;
a selector for selecting a most accurate value of said first and second positions, that will be used as a new position by said flight management system;
an updating system operable to generate an updating position, said updating system simultaneously integrating a manually-operated fly over updating device for updating through flying over, a manually-operated radar updating device for updating through radar, and an automatically-operated take off updating device for updating during takeoff, the outlet of said updating system being connected to the inlet of said inertial and radio-navigation position calculating device so that the latter uses, during an update implemented by said updating system, an updating position generated by said updating system for determining said second position;

a controller compelling the selector to select, during an update implemented by said updating system (24), the second position determined by using said updating position; and a device for automatically cancelling a selection of sensors, other than inertial sensors, that supply data for determining a position of the aircraft, during a manual update performed by a crew member of the aircraft using the fly over updating device or the radar updating device.

6. The device according to claim 5, wherein the take off updating device automatically updates the position of the aircraft, if the data supplied by a satellite positioning system are not available during a takeoff of said aircraft, and wherein the selector again selects one of said first and second positions, that will be used as a new position by said flight management system, as soon as the data supplied by the satellite positioning system is again available.

7. A set of systems of an aircraft, comprising:
an inertial and anemometric reference system;
a flight calculation system; and
the flight management system of claim 5.

8. An aircraft comprising the device of claim 5.

* * * * *